(12) United States Patent
von Brzeski et al.

(10) Patent No.: US 8,694,887 B2
(45) Date of Patent: Apr. 8, 2014

(54) DYNAMIC CONTEXTUAL SHORTCUTS

(75) Inventors: Vadim von Brzeski, San Jose, CA (US);
Reiner Kraft, Gilroy, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1080 days.

(21) Appl. No.: 12/056,172

(22) Filed: Mar. 26, 2008

(65) Prior Publication Data

US 2009/0249256 A1  Oct. 1, 2009

(51) Int. Cl.
*G06F 17/00* (2006.01)
*G06F 3/00* (2006.01)
*G06F 3/048* (2013.01)

(52) U.S. Cl.
USPC ........... 715/708; 715/205; 715/230; 715/231; 715/254; 715/711

(58) Field of Classification Search
USPC .......................... 715/205, 230, 231, 711, 254
See application file for complete search history.

(56) References Cited

U.S. PATENT DOCUMENTS

| | | | | |
|---|---|---|---|---|
| 6,122,647 | A * | 9/2000 | Horowitz et al. | 715/205 |
| 6,763,496 | B1 * | 7/2004 | Hennings et al. | 715/205 |
| 6,910,184 | B1 * | 6/2005 | Yano et al. | 715/201 |
| 6,920,609 | B1 | 7/2005 | Manber et al. | |
| 7,028,027 | B1 | 4/2006 | Zha et al. | |
| 7,130,819 | B2 | 10/2006 | Wang et al. | |
| 7,194,693 | B2 * | 3/2007 | Cragun et al. | 715/747 |
| 7,284,008 | B2 * | 10/2007 | Henkin et al. | 1/1 |
| 7,346,606 | B2 * | 3/2008 | Bharat | 1/1 |
| 7,395,501 | B2 * | 7/2008 | Graham et al. | 715/254 |
| 7,406,659 | B2 * | 7/2008 | Klein et al. | 715/273 |
| 7,478,089 | B2 * | 1/2009 | Henkin et al. | 1/1 |
| 7,512,900 | B2 * | 3/2009 | Lynch et al. | 715/825 |
| 7,698,626 | B2 * | 4/2010 | Baluja et al. | 715/205 |
| 7,822,743 | B2 * | 10/2010 | Henkin et al. | 707/726 |
| 2002/0069222 | A1 * | 6/2002 | McNeely | 707/513 |
| 2005/0055628 | A1 * | 3/2005 | Chen et al. | 715/512 |
| 2005/0060162 | A1 * | 3/2005 | Mohit et al. | 705/1 |
| 2006/0005113 | A1 * | 1/2006 | Baluja et al. | 715/501.1 |
| 2006/0026013 | A1 | 2/2006 | Kraft | |
| 2006/0156222 | A1 * | 7/2006 | Chi et al. | 715/512 |
| 2006/0167857 | A1 | 7/2006 | Kraft et al. | |
| 2007/0074102 | A1 | 3/2007 | Kraft | |
| 2007/0083429 | A1 | 4/2007 | Kraft | |
| 2007/0118803 | A1 * | 5/2007 | Walker et al. | 715/744 |

OTHER PUBLICATIONS

"Yahoo! Shortcuts" http://shortcuts.yahoo.com/how-it-works.html, 2 pgs., 2007.
"What is the Yahoo! Shortcuts plugin for Wordpress?" http://help.yahoo.com/l/us/yahoo/search/webpublishers/shortcuts/pubshortcuts-01.html, 5 pgs., 2008.

* cited by examiner

*Primary Examiner* — Nicholas Ulrich (74) *Attorney, Agent, or Firm* — Berkeley Law & Technology Group, LLP (57) ABSTRACT

Subject matter disclosed herein may relate to dynamically selecting and/or determining terms for use with contextual shortcuts in electronic documents such as, for example, web pages.

36 Claims, 8 Drawing Sheets

Yahoo!® News

Egypt to limit tourists to Tutankhamun tomb

Cairo (AFP) – Egypt said on Sunday it will restrict the number of visitors to the tomb of the boy pharaoh Tutankhamun in the Valley of the Kings to 400 a day from next month.

It also plans to close the tomb to visitors indefinitely from May next year in order to carry out restoration work, Supreme Council for Antiquities secretary general Zahi Hawass said in a statement.

"The tomb receives a lot of visitors and is considered one of the most famous pharonic tombs in the valley of the kings," Hawass said.

The true face of ancient Egypt's boy king was revealed last week to the public for the first time since he died more than 3,000 years ago.

The pharaoh's mummy was moved from its ornate sarcophagus in the tomb where its 1922 discovery caused an international sensation to a nearby climate-controlled case where experts say it will be better preserved.

Yahoo!® News

Egypt to limit tourists to Tutankhamun tomb

Cairo (AFP) – Egypt said on Sunday it will restrict the
number of visitors to the tomb of the boy pharaoh
Tutankhamun in the Valley of the Kings to 400 a day from
next month.

It also plans to close the tomb to visitors indefinitely from
May next year in order to carry out restoration work,
Supreme Council for Antiquities secretary general Zahi
Hawass said in a statement.

"The tomb receives a lot of visitors and is considered one
of the most famous pharonic tombs in the valley of the
kings," Hawass said.

The true face of ancient Egypt's boy king was revealed
last week to the public for the first time since he died more
than 3,000 years ago.

The pharaoh's mummy was moved from its ornate
sarcophagus in the tomb where its 1922 discovery caused
an international sensation to a nearby climate-controlled
case where experts say it will be better preserved.

Yahoo!® News

Egypt to limit tourists to Tutankhamun tomb

Cairo (AFP) – Egypt said on Sunday it will restrict the
number of visitors to the tomb of the boy pharaoh
Tutankhamun in the Valley of the Kings to 400 a day from
next month.

It also plans to close the tomb to visitors indefinitely from
May next year in order to carry out restoration work,
Supreme Council for Antiquities secretary general Zahi
Hawass said in a statement.

"The tomb receives a lot of visitors and is considered one
of the most famous pharonic tombs in the valley of the
kings," Hawass said.

The true face of ancient Egypt's boy king was revealed
last week to the public for the first time since he died more
than 3,000 years ago.

The pharaoh's mummy was moved from its ornate
sarcophagus in the tomb where its 1922 discovery caused
an international sensation to a nearby climate-controlled
case where experts say it will be better preserved.

Yahoo! News

Egypt to limit tourists to Tutankhamun tomb

Cairo (AFP) – Egypt said on Sunday it will restrict the number of visitors to the tomb of the boy pharaoh Tutankhamun in the Valley of the Kings to 400 a day from next month.

It also plans to close the tomb to visitors indefinitely from May next year in order to carry out restoration work, Supreme Council for Antiquities secretary general Zahi Hawass said in a statement.

"The tomb receives a lot of visitors and is considered one of the most famous pharonic tombs in the valley of the kings," Hawass said.

The true face of ancient Egypt's boy king was revealed last week to the public for the first time since he died more than 3,000 years ago.

The pharaoh's mummy was moved from its ornate sarcophagus in the tomb where its 1922 discovery caused an international sensation to a nearby climate-controlled case where experts say it will be better preserved.

DYNAMIC CONTEXTUAL SHORTCUTS

FIELD

Subject matter disclosed herein may relate to dynamically selecting and/or determining terms for use with contextual shortcuts in electronic documents such as, for example, web pages.

BACKGROUND

With networks such as the Internet gaining tremendous popularity, and with the vast multitude of pages and/or other documents and/or other media content becoming available to users via the World Wide Web (web), it has become desirable to provide efficient and streamlined approaches to searching for information desired by a user. Search systems and processes have been developed to meet the needs of users to obtain the desired information. Search engines, such as, for example, those provided over the web by Yahoo!, Google, and other web sites may be used by individuals to gather information. Typically, a user may input a query term and/or phrase and the search engine may return one or more links to sites and/or documents related to the query. The links returned may be very related, or they may be completely unrelated, to what the user was actually looking for. The "relatedness" of results to the query may be in part a function of the actual query entered as well as the robustness of the search system (underlying collection system) used.

Other techniques for allowing a user to specify desired information have been developed. For one example, in some or most news stories found at the Yahoo! News web site, various words may be highlighted in some fashion (underlined, for example) to indicate that the highlighted words represent keywords. The keywords may be selected by the user (by clicking on the keyword, for example) and additional information and/or documentation and/or links may be provided by a search engine or by some other agent. In this manner, the keywords may help the user to gather additional information and to dig deeper into the subjects that the user desires to learn more about. For example, if a user is reading a news story and desires more information on a topic, the user may select a keyword. A new box or window may open to provide the user with links to various other sources of information on the topic. The various sources of information may include, for example, related news stories, web sites, news photos, etc., that may add context to the topic. Difficulties with this approach to allowing a user to specify desired information may include, for example, challenges in determining which words of a news story might be of interest to a user.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that if executed by a computing platform, such as a computer, a computing system, an electronic computing device, a cellular phone, a personal digital assistant, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. For an embodiment, instructions may comprise run-time objects, such as, for example, Java and/or Javascript objects. However, these are merely examples of an instruction, and the scope of claimed subject matter is not limited in this respect.

Unless specifically stated otherwise, as apparent from the following discussion, it is appreciated that throughout this specification discussions utilizing terms such as processing, computing, calculating, selecting, forming, enabling, inhibiting, identifying, initiating, receiving, transmitting, determining, estimating, incorporating, adjusting, modeling, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

As discussed above, the vast quantities of information available via the world wide web poses challenges for users seeking out information on particular topics. As also mentioned above, one approach to allowing a user to specify desired information may include highlighting keywords in an online document such as, for example, a news story on a web site. The keywords may represent query terms and/or phrases that may be used by a search engine or other agent to provide links to other documents, web sites, and/or other media content. These keywords may also be referred to as "contextual shortcuts", in that they may provide shortcuts (links) to additional content related to the particular topic identified by the keyword. The contextual shortcuts may comprise hyperlinks for an example embodiment.

As used herein, the term "electronic document" is meant to include any information in a digital format that may be perceived by a user if displayed by a digital device, such as, for example, a computing platform. For one or more embodiments, an electronic document may comprise a web page coded in a markup language, such as, for example, HTML (hypertext markup language). However, the scope of claimed subject matter is not limited in this respect. Also, for one or more embodiments, the electronic document may comprise a number of elements. The elements in one or more embodiments may comprise text, for example as may be displayed on a web page. Also for one or more embodiments, the elements may comprise a graphical object, such as, for example, a digital image. Also, as used herein, "term" is meant to comprise a string of one or more words and/or abbreviations, for example, although the scope of claimed subject matter is not limited in this respect.

Further, as used herein, the term "contextual shortcut" is meant to include any link, pointer, device, technique, etc., that if selected in some fashion by a user results in a computing platform retrieving and/or displaying information related to a term associated with the contextual shortcut and/or results in altering the appearance of information in the electronic document. Contextual shortcuts may comprise a user-centric entity detection platform which may identify relevant and interesting phrases in text ("entities"), and which may convert such entities into actionable links ("shortcuts"), allowing the user to retrieve more information for these entities, e.g. search results, map views, etc. However, the scope of claimed subject matter is not limited in these respects. In an embodiment, a contextual shortcut may be represented by and/or associated with a portion of text. In an example embodiment, a word or phrase of text may be underlined, with the underlining denoting a shortcut. The shortcut may comprise a hyperlink for an example embodiment, although again the scope of claimed subject matter is not limited in these respects.

Figure 1:
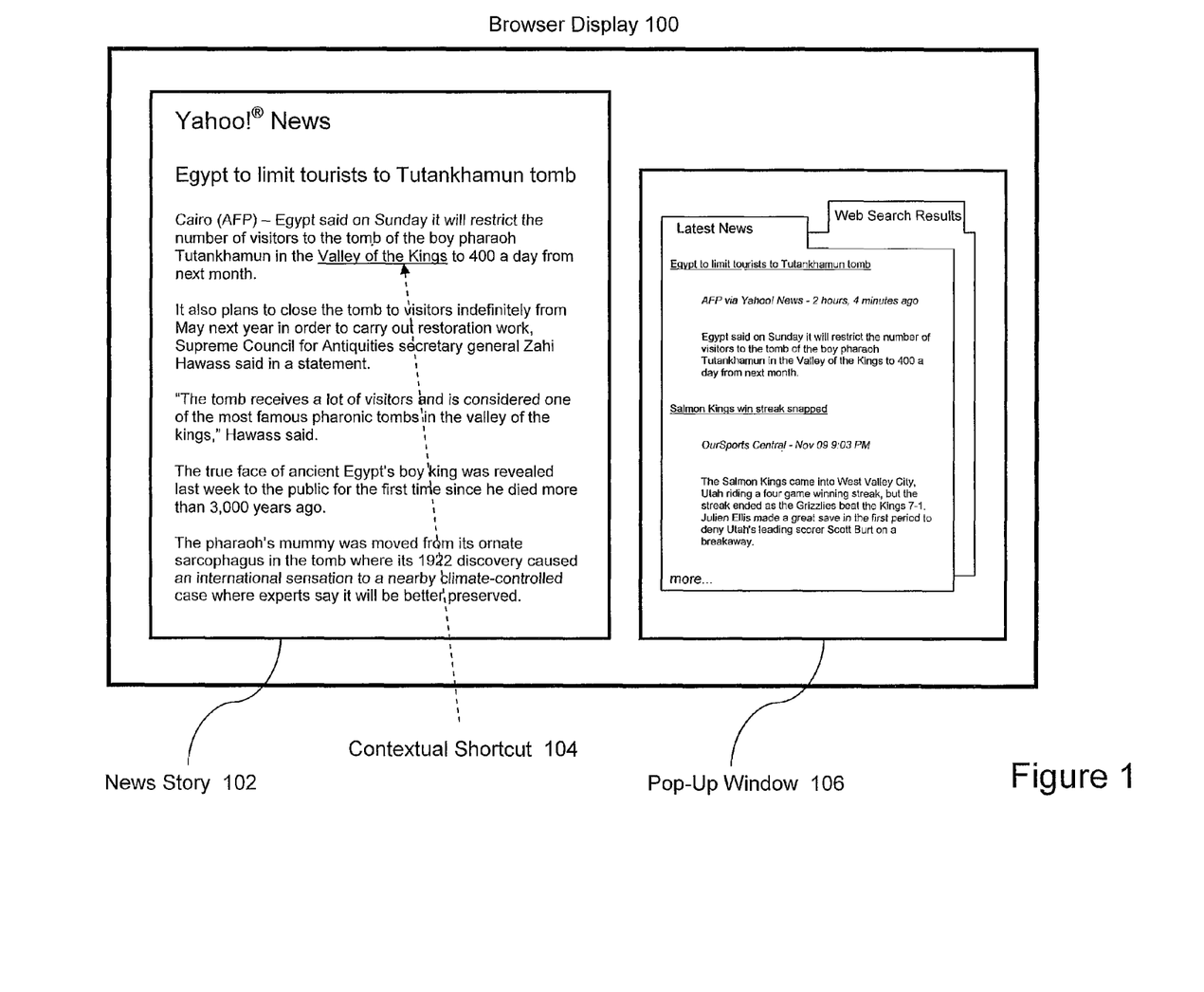
FIG. 1 is a diagram illustrating an example web browser display including a news story in accordance with one or more embodiments.

FIG. 1 is a diagram illustrating an example web browser display 100. The display may be viewed by a user on an electronic device such as, for example, a computing platform. For this example, browser display 100 may be generated by a web browser application that facilitates navigation of the web by the user. The web browser may display any of a very wide range of information from a very wide range of web sites located across the web. For this example, browser display 100 depicts a news story 102 from a Yahoo!® News website. Of course, this is merely an example of the types of information that may be displayed via the web browser, and the scope of claimed subject matter is not limited in this respect.

For this example, a contextual shortcut 104 ("Valley of the Kings") is embedded within news story 102. The underlining of the text "Valley of the Kings" for this example indicates to the user that the underlined text is associated with and/or represents a shortcut. If a user, upon reading news story 102, desires additional information regarding the subject of contextual shortcut 104, the user may select the contextual shortcut. For an embodiment, the user may select contextual shortcut 104 by "clicking" on the shortcut with a pointing device (such as, for example, a mouse), although the scope of claimed subject matter is not limited in this respect.

In response to selecting the contextual shortcut, a pop-up window 106 may be displayed. Pop-up window 106 may include additional information related to the subject of contextual shortcut 104. For this example, additional information related to the "Valley of the Kings" is displayed. The information may include, for example, hyperlinks to other websites and/or other documents or stories within the same website where additional information may be found. The information may also include photographs and/or other media content. Any of a wide range of information types may be included in the pop-up window. Although this example embodiment describes a pop-up window for displaying information to the user in response to a selection of a contextual shortcut, other embodiments may utilize other techniques for communicating the additional information to the user, and the scope of claimed subject matter is not limited in this respect. For example, the additional information may be presented in an overlay, and/or in a sidebar, although again, the scope of claimed subject matter is not limited in these respects. By providing contextual shortcut 104, the developers of the website make it easier for the user to gather relevant information related to a topic of interest.

As discussed previously, difficulties with the contextual shortcut approach discussed above may include challenges in determining which topics in an online document might be of interest to users. To underline or otherwise highlight every term that may be of interest to a user on a web page would result in a possibly cluttered, messy, difficult to read page. If a substantial portion of a news story, for example, is highlighted, nothing will stand out to the user and the user may experience difficulties in readily gathering information on topics of interest to the user. At least in part, these difficulties may be a result of the static nature of a contextual shortcut implementation such as that discussed above in connection with FIG. 1. The contextual shortcut solution depicted in FIG. 1 may operates as a static detector. This means that once N relevant/interesting entities have been chosen to show in a piece of text, all N of them are shown to the user, and the possible selections and displays never change. That is, the "shortcuts" are static. Furthermore, for the example of FIG. 1, the decisions regarding witch N entities to show to the user may be based on internal algorithms in which the N entities may be filtered from a larger set of M entities, dropping M−N entities in the process, and making that decision for the user without his/her input.

Embodiments described herein may comprise one or more processes for dynamically controlling which highlighted elements (contextual shortcuts) to show the user. In general, and in accordance with one or more embodiments of a process for dynamically displaying contextual shortcuts, an electronic document, such as a web page, for example, may comprise a number of text elements. For example, a news story such as story 102 may comprise text in the form of words, sentences, and paragraphs, for example. One or more words grouped together may in some cases comprise a term. Each term of the document may comprise an element (perhaps referred to as an "entity") of the document. For this example embodiment, the electronic document may include a relatively small number of highlighted elements. For an example, the highlighted elements may comprise terms that are underlined. The underlining may communicate to a user that the underlined term comprises a contextual shortcut. If the user clicks on an underlined element, additional information related to the selected element may be displayed such as, for one example, as discussed above in connection with FIG. 1.

Also, for an embodiment, additional elements of the electronic document may become highlighted in response to the selection by the user of the previously-mentioned highlighted element. The additional elements may be determined, at least in part, in accordance with how closely related the various elements of the document are to the selected element. In this manner, if a user selects one highlighted element, other elements of the document that may be relatively closely related to the selected element also become highlighted, thereby providing the user alternative options for gathering desired information. Each of the newly highlighted elements may comprise shortcuts to additional information related to the topic indicated by the text element. Of course, this is merely an example embodiment of a process for dynamically displaying contextual shortcuts, and the scope of claimed subject matter is not limited in these respects.

In one or more embodiments described herein, decisions regarding which contextual shortcuts to display may be made dynamically, and may be based, at least in part, on user actions. In an embodiment, all or substantially all M contextual shortcuts in an electronic document may be identified, but only a smaller "seed" subset S of elements may be initially displayed to the user, where S<M, and where possibly (but not necessarily) S is less that the number N of entities that would otherwise have been chosen for display if based on the static model discussed above in connection with FIG. 1.

In one or more embodiment, a model of relationships between the M elements (contextual shortcuts) may be maintained, and decisions regarding which contextual shortcuts to display to the user may be based at least in part on the relationships between the M elements. In response to a user clicking on one of the S seed set elements, a determination may be made as to which of the other M elements to display to the user. That is, the display of contextual shortcuts is made dynamic, and is based on input received from the user. The contextual shortcuts shown to the user are therefore more tailored to the user's interests, and a more enjoyable and/or productive browsing and/or searching experience may result.

For one example, assume that the M contextual shortcuts identified in an electronic document comprise {A, B, C, D, E, F, G, H} and that {A, D, G}, {B, C, E}, and {F, H} are three groups of closely related elements. Initially, for this example, {A, B, F} are shown to the user. If the user clicks on B, {C, E} are also displayed to the user. Also, for an embodiment, {A, F} may be turned off (no longer highlighted) if they are not sufficiently strongly related to {B, C, E}. However, the scope of claimed subject matter is not limited in this respect.

For this example, if M is large and if the relationships among the M elements are complex, there may exist a large range of possible "display paths" in the document, and the display paths are based on inputs ("clicks") received from the user, thus providing the sense that the contextual shortcut embodiment is "listening to the user".

The relationships among the M elements may take on any of a number of forms in one or more embodiments. For example, one such form may comprise a graph, e.g. a "concept network". For another example, the form may comprise a scoring function which may assign a numerical score to how two elements may be related. Collaborative filtering approaches based on prior user click data may be used to derive such scores, in an embodiment. However, these are merely examples of how relationships among the elements of an electronic document may be determined and/or stored, and the scope of claimed subject matter is not limited in these regards.

Figure 2:
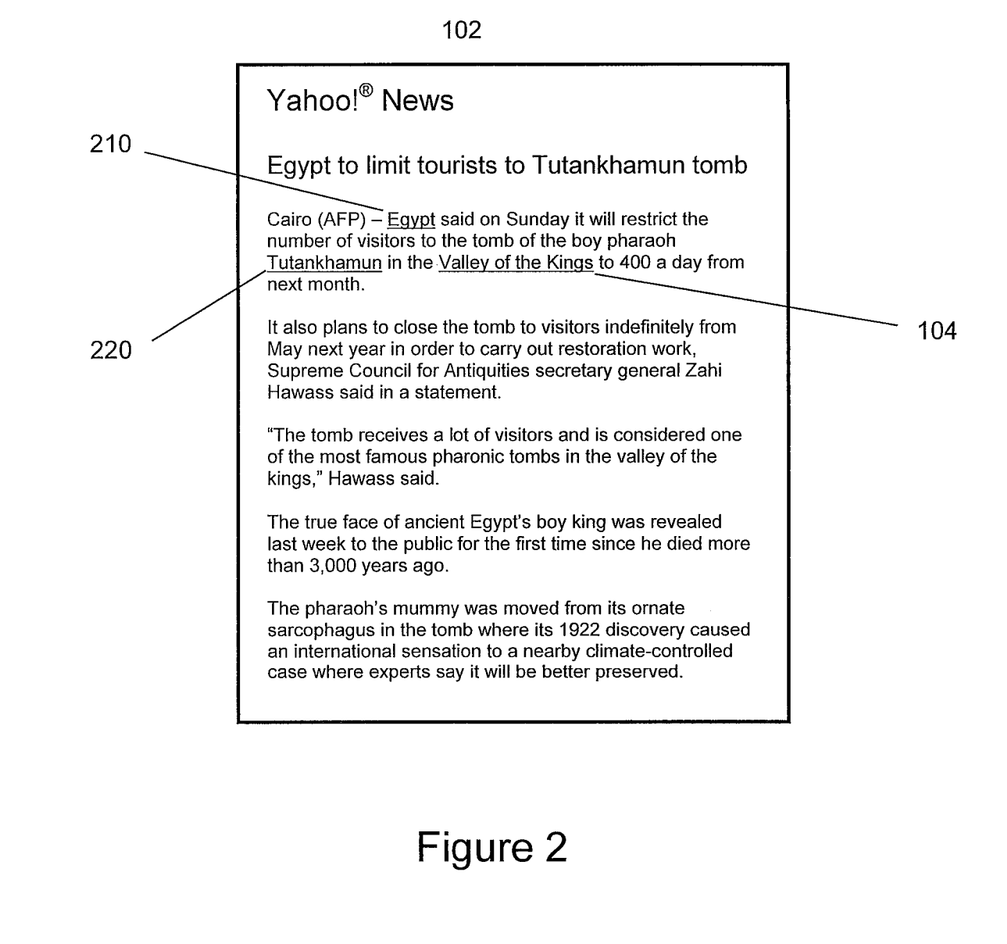
FIG. 2 is a diagram illustrating an example news story from an example web page in accordance with one or more embodiments.

FIG. 2 is a diagram illustrating example news story 102 from an example web page, wherein news story 102 includes a relatively small number of highlighted elements in accordance with one or more embodiments. For this example, a relatively small number of elements may be highlighted in order to produce an orderly and clear display of the contents of the news story. The story is not cluttered with a large number of highlighted elements, and therefore readability is maintained. The relatively small number of highlighted elements may result in a more user-friendly web browsing experience, for example. For this example, elements "Egypt" 210, "Tutankhamen" 220, and "Valley of the Kings" 104 may be highlighted by way of underlining, although the scope of claimed subject matter is not limited in this respect. For other embodiments, elements may be highlighted in any of a range of techniques, including, but not limited to bolding, italicizing, utilization of alternate fonts, utilization of different colors, shading, etc. Further, for one or more embodiments, the highlighting of the elements denotes a contextual shortcut, in that, for example, a selection by a user of a highlighted element may prompt additional information related to the selected term to be displayed, such as, for example, described above in connection with FIG. 1.

For one or more embodiments, if a user selects one of the relatively small number of highlighted elements, additional elements of the electronic document may become highlighted. These additional elements may comprise contextual shortcuts. The additional elements that become highlighted in response to a selection by a user of one of the originally highlighted elements may be chosen in one or more embodiments based on how closely related the elements are to the selected element.

Figure 3:
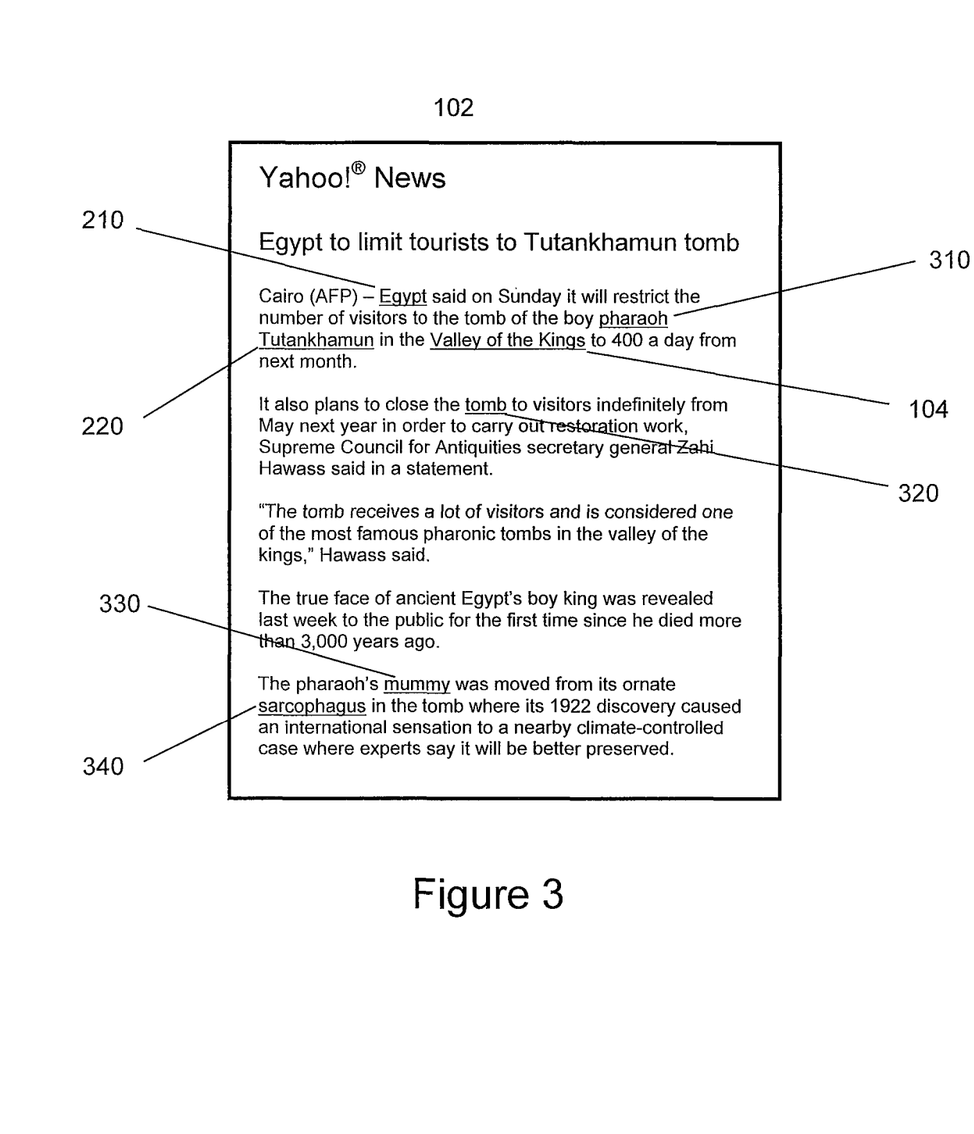
FIG. 3 is a diagram illustrating an example news story from an example web page in accordance with one or more embodiments.

FIG. 3 is a diagram illustrating example news story 102, wherein the news story includes a larger number of highlighted elements. The larger number of highlighted elements includes a set of additional elements that became highlighted in response to a selection of an earlier-highlighted element by a user. For this example, it is assumed that a user has selected element 220 "Tutankhamen." In response to the selection by the user, additional elements 310, 320, 330, and 340 ("pharaoh", "tomb", "mummy", and "sarcophagus", respectively) become highlighted. These newly highlighted elements may be related, perhaps closely related, to the term "Tutankhamen" selected by the user. The user may, at this point for example, click on any of the additional highlighted elements to gather additional desired information.

In response to a selection of one of the additional highlighted elements, information related to the selected term may be displayed to the user. The additional information may be included in an overlay on the web page, or in a sidebar, or in a pop-up window, to list just a few examples of how information may be displayed to the user. In an embodiment, the information may comprise links to other web pages, for example. Of course, these are merely examples of actions that may be taken in response to a user selecting a highlighted element, and the scope of claimed subject matter is not limited in these respects.

For the example embodiment described above in connection with FIG. 3, the relatively small number of previously highlighted elements 104, 210, and 220 may remain highlighted upon a selection of one of the elements by the user. However, other embodiments are possible where on or more of the previously highlighted elements may become non-highlighted if one of the elements is selected by the user.

In one or more embodiments, the particular elements of an electronic document such as, for example, news story 102 that are highlighted may continually be updated according to selections by the user. For example, if the user selects one or more of the newly highlighted elements 310-340, yet further elements may become highlighted. Previously highlighted elements may become non-highlighted, for one or more embodiments. In this manner, the elements that are highlighted in an electronic document may be occasionally updated according to inputs (selections via "clicking", for example) from the user, thereby providing the user with a customized browsing experience that may more closely match the user's interests.

Figure 4:
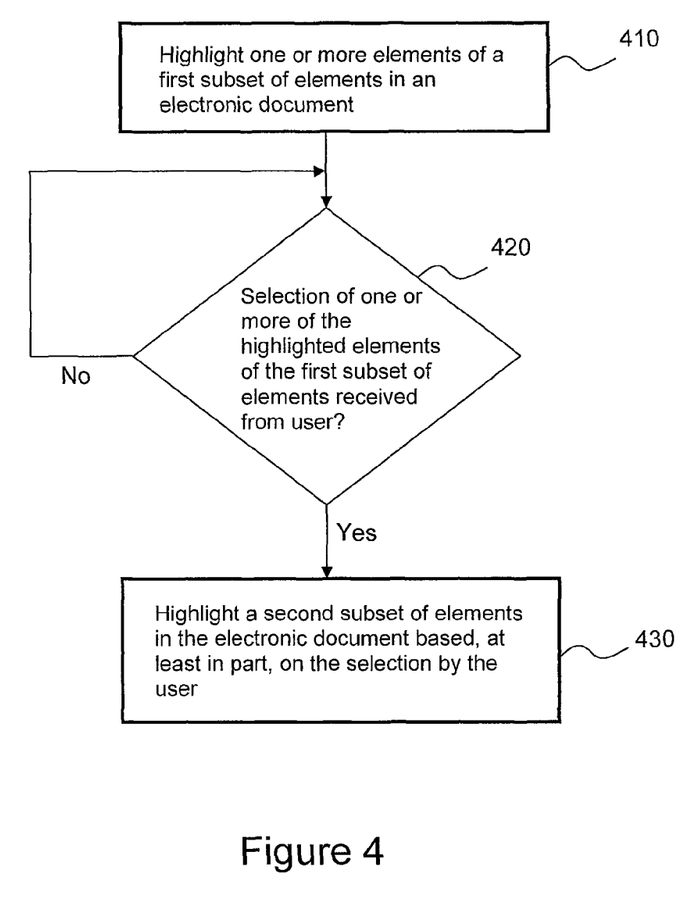
FIG. 4 is a flow diagram illustrating an example process for dynamically displaying contextual shortcuts in accordance with one or more embodiments.

FIG. 4 is a flow diagram illustrating an example embodiment of a process for dynamically displaying contextual shortcuts. At block 410, one or more elements of a first subset of elements in an electronic document may be highlighted. For this example embodiment, the electronic document may comprise at least a portion of a web page, although the scope of claimed subject matter is not limited in this respect. Further, for one or more embodiments, the highlighted elements may comprise hyperlinks that if selected by a user result in the display of additional information and/or in the display of additional highlighted elements. As indicated at blocks 420 and 430, if the user selects one or more of the highlighted elements of the first subset of elements, a second subset of elements in the electronic document may be highlighted based, at least in part, on the selection by the user. The second subset of highlighted elements may be chosen based on whether or not the elements are closely related to the element selected by the user. Any of a wide range of techniques and/or processes for determining "relatedness" between the selected highlighted element and the possible additional highlighted elements may be utilized in accordance with one or more embodiments, and claimed subject matter is not limited to any particular approach. Example processes in accordance with claimed subject matter may include all, more than all, or less than all of blocks 410-430. Further, the order of blocks 410-430 is merely an example order, and the scope of claimed subject matter is not limited in this respect.

Figure 5:
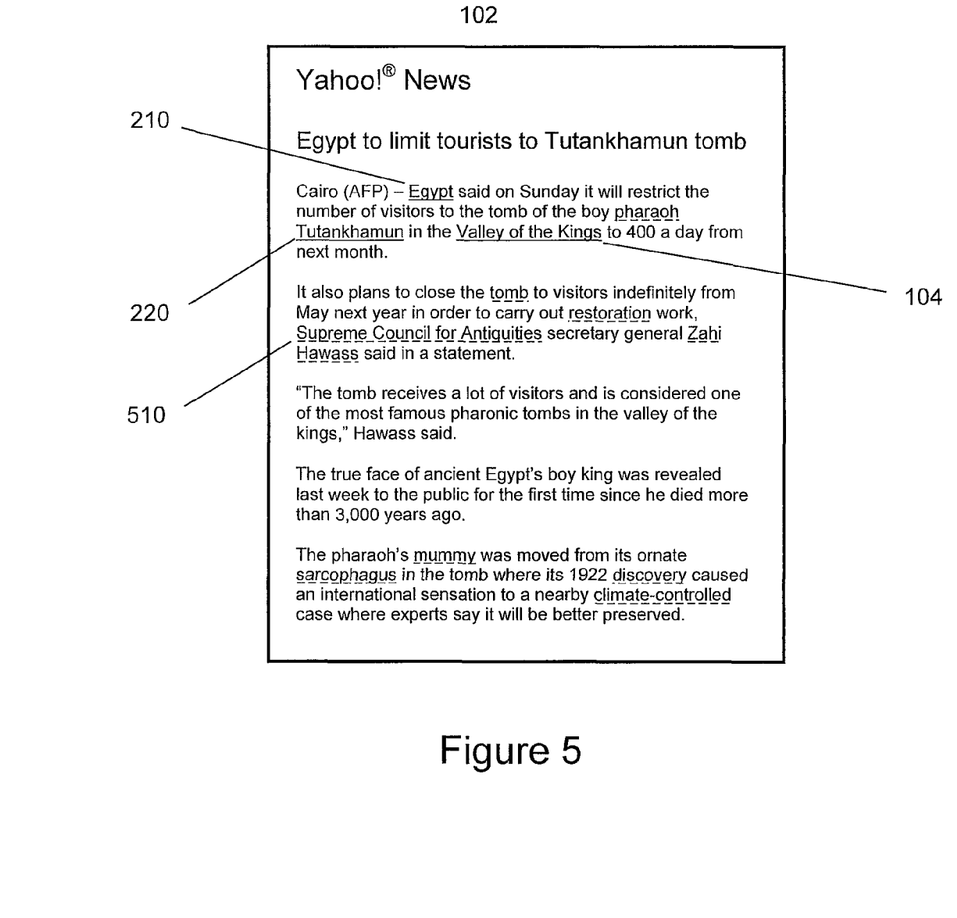
FIG. 5 is a diagram illustrating an example news story from an example web page in accordance with one or more embodiments.

FIG. 5 is a diagram illustrating example news story 102, wherein the news story includes a number of highlighted elements 210, 220, and 104, and a number of non-highlighted elements such as element 510 each associated with a contextual shortcut. Other non-highlighted elements for news story 102 include, for this example, the elements "pharaoh", "restoration", "Supreme Council for Antiquities", "Zahi Hawass", "mummy", "sarcophagus", "discover", and "climate-controlled" as illustrated in FIG. 5 by the broken underlining of these elements. The dashed underlines for this example would not actually be displayed to a user, but are included in FIG. 5 merely to denote the "hidden" contextual shortcuts. Thus, for this example, news story 102 includes a relatively small number of highlighted elements, and a larger number of non-highlighted elements. One possible benefit from highlighting only a relatively small number of elements of news story 102 is that the news story may be more easily read than might be the case with many elements highlighted.

For an embodiment, a user may click on one of the highlighted elements if the user desires to obtain additional information regarding one of those terms, and/or may "mouse over" other elements of news story 102. As used herein, the term "mouse-over" is meant to denote a user utilization a pointing device, such as, for example, a mouse and/or trackpad, to place a cursor over a portion of the display. For an embodiment, if the user mouses-over one of the hidden elements, that element may become highlighted in some fashion to alert the user that the element comprises a contextual shortcut.

Figure 6:
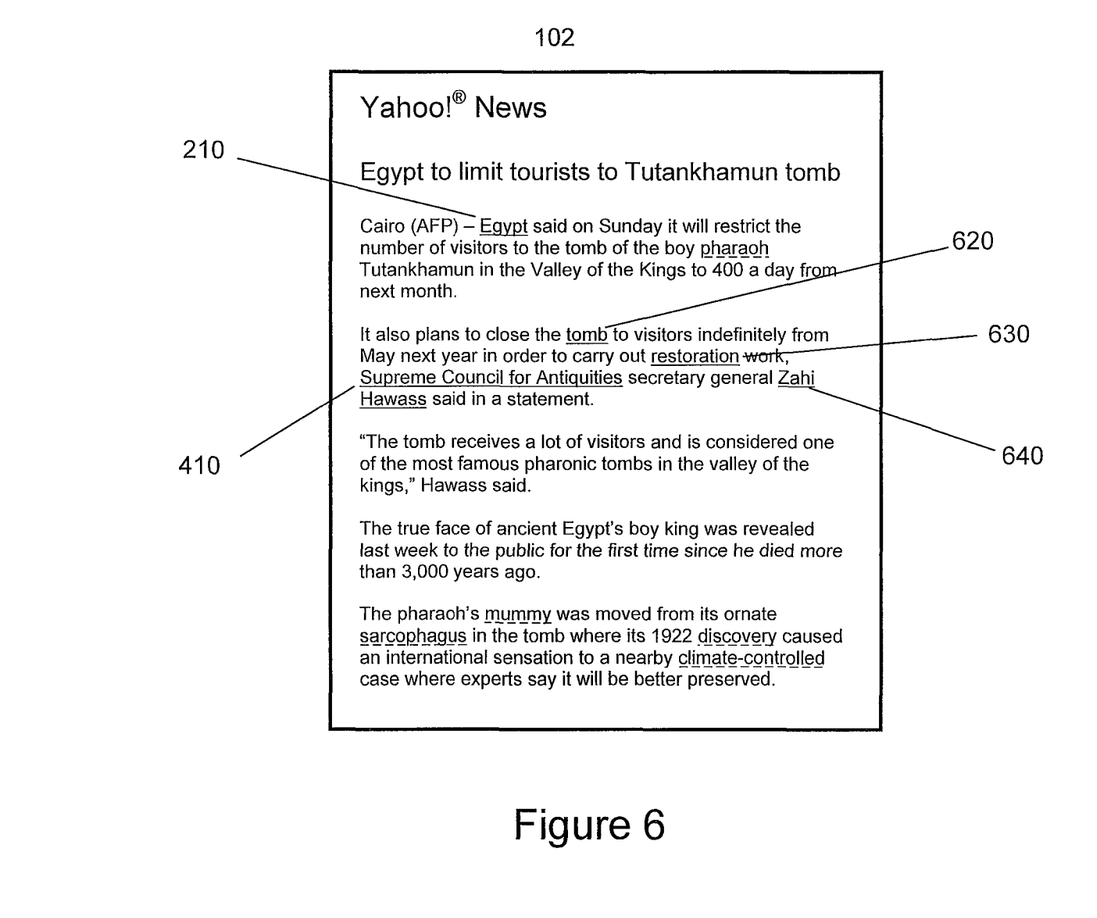
FIG. 6 is a diagram illustrating an example news story from an example web page in accordance with one or more embodiments.

FIG. 6 is a diagram illustrating example news story 102 from the example web page depicted in FIG. 5. However, in FIG. 6, some of the previously non-highlighted elements have been highlighted. For this example, it is assumed that a user observed the news story as depicted in FIG. 5, and desired to research additional information regarding the Supreme Council for Antiquities (element 510). It is further assumed that the user moused-over element 510, and observed that element 510 comprises a contextual shortcut. It is also assumed that the user selected (clicked on) element 510. In response to the selection of element 510, other previously hidden elements of news story 102 for this example are highlighted, thereby providing the user with additional options for obtaining additional information regarding the "Supreme Council for Antiquities" or other related topics. Note that for this example, other non-highlighted elements, perhaps those not thought to be closely related to element 510, remain hidden.

For the example embodiment discussed above in connection with FIG. 6, only a relatively few number of contextual shortcuts are initially highlighted. For an embodiment, these relatively few highlighted elements may comprise contextual shortcuts that are relatively very likely to be of interest to a user. For example, the highlighted elements may comprise topics that are closely related to the title of the news story, in an embodiment. The relatively few highlighted elements may make for a more readable document, and the larger number of non-highlighted elements may provide the user with a wider range of possible topics to explore without having the many contextual shortcuts clutter the appearance of the document.

Figure 7:
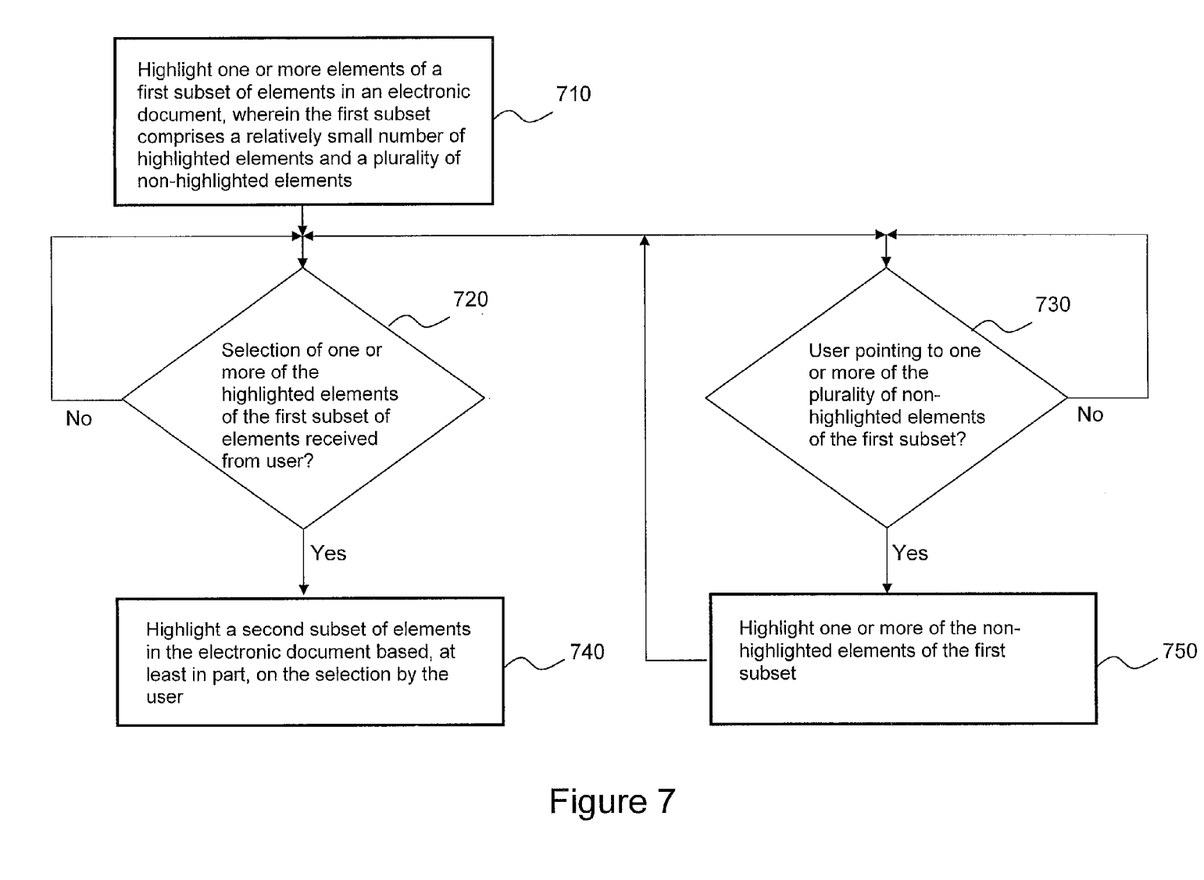
FIG. 7 is a flow diagram illustrating an example process for dynamically displaying contextual shortcuts in accordance with one or more embodiments.

FIG. 7 is a flow diagram illustrating an example process for dynamically displaying contextual shortcuts. At block 710, one or more elements of a first subset of elements in an electronic document may be highlighted. For this example, the first subset may comprise a relatively small number of highlighted elements and also may comprise a plurality of non-highlighted elements. As indicated at blocks 720 and 740, if a user selects one or more of the highlighted elements of the first subset of elements, a second subset of elements in the electronic document may be highlighted. For an embodiment, the second subset of elements may be highlighted based, at least in part, on the selection by the user. That is, the element selected by the user may be used to determine which other elements of the electronic document to display.

Further, for one embodiment, concurrent with the operations of blocks 720 and 740 as discussed above, one or more of the non-highlighted elements of the first subset of elements may be highlighted in response to the user pointing to (mousing-over) one or more of the non-highlighted elements of the first subset, as depicted at blocks 730 and 750. As also depicted in FIG. 7, if one or more of the non-highlighted elements is highlighted at block 750, processing may return to both blocks 720 and 730, for an example embodiment. Embodiments in accordance with claimed subject matter may include all, less than, or more than blocks 710-750. Furthermore, the order of blocks 710-750 is merely an example order, and the scope of claimed subject matter is not limited in these respects.

Figure 8:
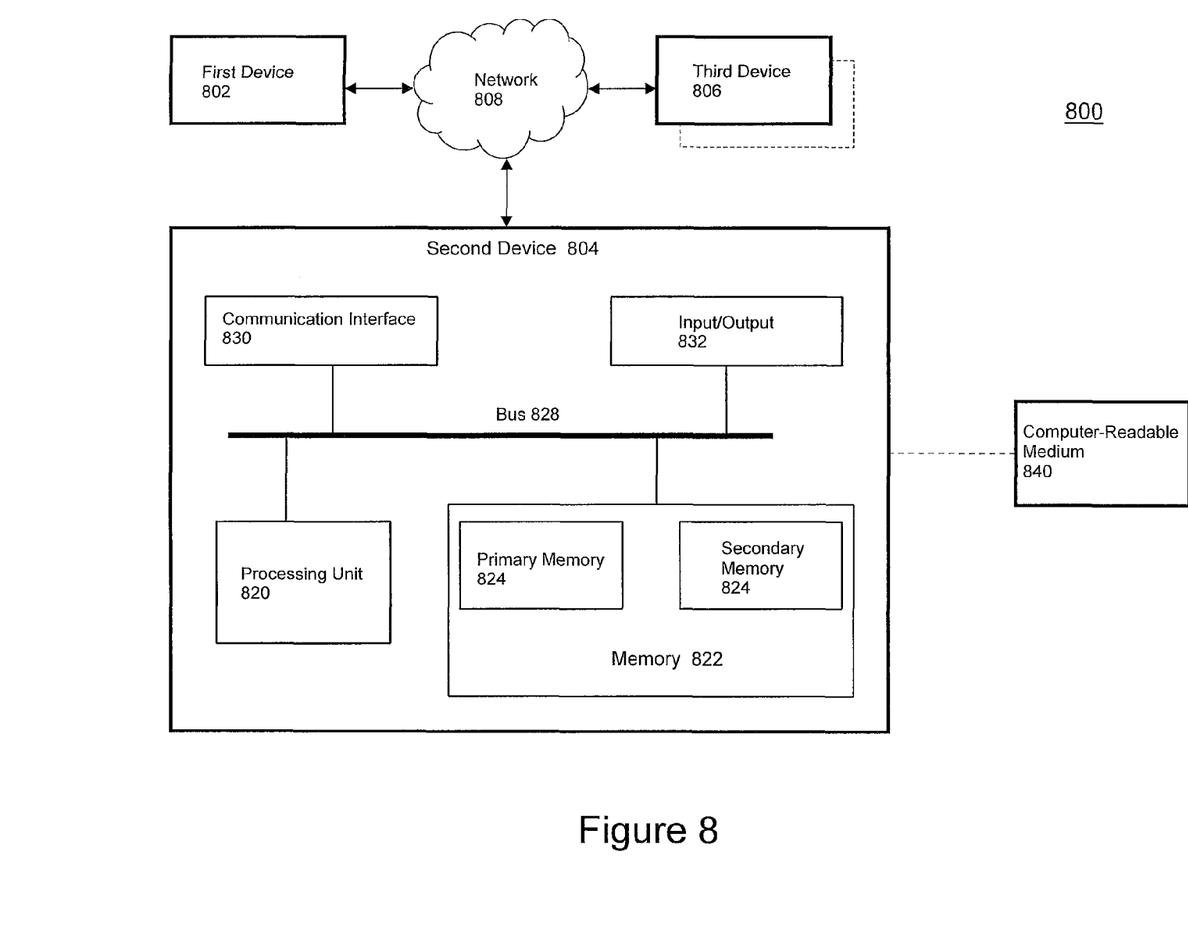
FIG. 8 is a block diagram illustrating an example system comprising a plurality of computing devices coupled via a network in accordance with one or more embodiments.

FIG. 8 is a schematic diagram illustrating an exemplary embodiment of a computing environment system 800 that may include one or more devices configurable to dynamically display contextual shortcuts using one or more techniques discussed above in connection with FIGS. 1-7, for example. System 800 may include, for example, a first device 802, a second device 804, and a third device 806, which may be operatively coupled together through a network 808.

First device 802, second device 804 and third device 806, as shown in FIG. 8, may be representative of any device, appliance or machine that may be configurable to exchange data over network 808. By way of example but not limitation, any of first device 802, second device 804, or third device 806 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 808, as shown in FIG. 8, is representative of one or more communication links, processes, and/or resources configurable to support the exchange of data between at least two of first device 802, second device 804, and third device 806. By way of example but not limitation, network 808 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 806, there may be additional like devices operatively coupled to network 808.

It is recognized that all or part of the various devices and networks shown in system 800, and the processes and methods as further described herein, may be implemented using or otherwise include hardware, firmware, software, or any combination thereof.

Thus, by way of example but not limitation, second device 804 may include at least one processing unit 820 that is operatively coupled to a memory 822 through a bus 828.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof.

Memory 822 is representative of any data storage mechanism. Memory 822 may include, for example, a primary memory 824 and/or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

Secondary memory 826 may include, for example, the same or similar type of memory as primary memory and/or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any medium that can carry and/or make accessible data, code and/or instructions for one or more of the devices in system 800.

Second device 804 may include, for example, a communication interface 830 that provides for or otherwise supports the operative coupling of second device 804 to at least network 808. By way of example but not limitation, communication interface 830 may include a network interface device or card, a modem, a router, a switch, a transceiver, and the like.

Second device 804 may include, for example, an input/output 832. Input/output 832 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 832 may include an operatively configured display, speaker, keyboard, mouse, trackball, touch screen, data port, etc.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
   identifying a plurality of elements of an electronic document;
   highlighting a first subset of the plurality of elements of the electronic document utilizing a processor of a computing platform, wherein the first subset of elements is highlighted based, at least in part, on a relationship between one or more elements of the plurality of elements; and
   highlighting a second subset of the plurality of elements of the electronic document utilizing the processor of the computing platform at least in part in response to a selection by a user of one or more of the highlighted elements of the first subset of elements, wherein the second subset of the plurality of elements is selected for highlighting based, at least in part, on one or more relatedness factors between one or more elements of the plurality of elements and the one or more highlighted elements of the first subset selected by the user, wherein the second subset of the plurality of elements comprises one or more elements different from the first subset of the plurality of elements, and wherein the elements of the first and second subsets of the plurality of elements individually comprise contextual shortcuts comprising hyperlinks.

2. The method of claim 1, wherein the first subset of the plurality of elements comprises a seed group of elements selected from a respective plurality of subsets of the plurality of elements including the second subset, and wherein the one or more highlighted elements of the first subset selected by the user further comprises an element of the second subset.

3. The method of claim 2, wherein the first and second subsets of the plurality of elements individually comprise contextual shortcuts further comprising text elements.

4. The method of claim 3, further comprising receiving at the computing platform the selection by the user, wherein the computing platform comprises a server computing platform, and wherein the highlighting the second subset of the plurality of elements comprises highlighting the second subset of the plurality of elements at the server computing platform.

5. The method of claim 4, wherein the highlighting the first subset of the plurality of elements and the highlighting of the second subset of the plurality of elements comprises underlining of the text elements.

6. The method of claim 4, further comprising determining one or more elements of the second subset of the plurality of elements based, at least in part, on a plurality of relatedness factors associated with the selected one or more of the highlighted elements of the first subset of the plurality of elements and the second subset of the plurality of elements.

7. The method of claim 4, further comprising adding one or more new highlighted elements to the electronic document based, at least in part, on the selection of the one or more of the highlighted elements of the first subset of the plurality of elements.

8. The method of claim 4, wherein said receiving the selection by the user comprises detecting a pointing device click performed by the user.

9. The method of claim 4, wherein the first subset of the plurality of elements comprises a relatively small number of highlighted elements and an additional number of non-highlighted elements, and further comprising highlighting one or more of the non-highlighted elements in response to the user pointing to the one or more of the non-highlighted elements.

10. The method of claim 9, wherein said highlighting one or more of the non-highlighted elements in response to the user pointing to the one or more non-highlighted elements comprises highlighting one or more of the non-highlighted elements in response to the user mousing over the one or more of the non-highlighted elements.

11. The method of claim 1, further comprising adding one or more elements to the electronic document based, at least in part, on the selection by the user.

12. The method of claim 11, wherein said adding one or more elements to the electronic document based, at least in part, on the selection by the user comprises adding at least one of an overlay, a shortcut, a sidebar, and/or a portion of text.

13. An apparatus, comprising:
means for identifying a plurality of elements of an electronic document;
means for highlighting a first subset of the plurality of elements of the electronic document, wherein the first subset of elements is highlighted based, at least in part, on a relationship between one or more elements of the plurality of elements; and
means for highlighting a second subset of the plurality of elements of the electronic document at least in part in response to a selection by a user of one or more of the highlighted elements of the first subset of elements, wherein the second subset of the plurality of elements is selected for highlighting based, at least in part, on one or more relatedness factors between one or more elements of the plurality of elements and the one or more highlighted elements of the first subset selected by the user, wherein the second subset of the plurality of elements comprises one or more elements different from the first subset of the plurality of elements, and wherein the elements of the first and second subsets of the plurality of elements individually comprise contextual shortcuts comprising hyperlinks.

14. The apparatus of claim 13, wherein the first subset of the plurality of elements comprises a seed group of elements selected from the plurality of subsets of the plurality of elements in the electronic document, the plurality of subsets to include the second subset, and wherein the one or more highlighted elements of the first subset selected by the user further comprises an element of the second subset.

15. The apparatus of claim 14, wherein the first and second subsets of the plurality of elements individually comprise contextual shortcuts further comprising text elements.

16. The apparatus of claim 15, further comprising means for receiving the selection by the user, wherein the computing platform comprises a server computing platform, and wherein the means for highlighting the second subset of the plurality of elements comprises means for highlighting the second subset of the plurality of elements at the server computing platform.

17. The apparatus of claim 16, wherein the means for highlighting the first subset of the plurality of elements and the means for highlighting the second subset of the plurality of elements comprises means for underlining of the text elements.

18. The apparatus of claim 16, further comprising means for determining one or more elements of the second subset of the plurality of elements based, at least in part, on a plurality of relatedness factors associated with the selected one or more of the highlighted elements of the first subset of the plurality of elements and the the second subset of the plurality of elements.

19. The apparatus of claim 16, further comprising means for highlighting one or more additional elements in the electronic document based, at least in part, on the selection of the one or more highlighted elements of the first subset of the plurality of elements.

20. The apparatus of claim 16, wherein said means for receiving the selection by the user comprises means for detecting a pointing device click performed by the user.

21. The apparatus of claim 16, wherein the first subset of the plurality of elements comprises a relatively small number of highlighted elements and an additional number of non-highlighted elements, and further comprising means for highlighting one or more of the non-highlighted elements in response to the user pointing to the one or more of the non-highlighted elements.

22. The apparatus of claim 21, wherein said means for highlighting one or more of the non-highlighted elements in response to the user pointing to the one or more non-highlighted elements comprises means for highlighting one or more of the non-highlighted elements in response to the user mousing over the one or more of the non-highlighted elements.

23. The apparatus of claim 13, further comprising means for adding one or more elements to the electronic document based, at least in part, on the selection by the user.

24. The apparatus of claim 23, wherein said means for adding one or more elements comprises means for adding at least one of an overlay, a shortcut, a sidebar, and/or a portion of text.

25. An article, comprising: a non-transitory storage medium having stored thereon instructions executable by a processor of a computing platform to:
identify a plurality of elements of an electronic document;
highlight a first subset of the plurality of elements of the electronic document, wherein the first subset of elements is highlighted based, at least in part, on a relationship between one or more elements of the plurality of elements; and highlight a second subset of the plurality of elements of the electronic document at least in part in response to a selection by a user of one or more of the highlighted elements of the first subset of elements, the second subset of the plurality of elements to be selected for highlighting based, at least in part, on one or more relatedness factors between one or more elements of the plurality of elements and the one or more highlighted elements of the first subset selected by the user, the second subset of the plurality of elements to comprise one or more elements different from the first subset of the plurality of elements, and wherein the elements of the first and second subsets of the plurality of elements individually comprise contextual shortcuts comprising hyperlinks.

26. The article of claim 25, the first subset of the plurality of elements to comprise a seed group of elements selected from a respective plurality of subsets of the plurality of elements including the second subset, and the one or more highlighted elements of the first subset of the plurality of elements selected by the user further to comprise an element of the second subset.

27. The article of claim 26, the first and second subsets of the plurality of elements individually to comprise contextual shortcuts further comprising text elements.

28. The article of claim 27, wherein the computing platform comprises a server computing platform.

29. The article of claim 28, wherein the storage medium has stored thereon further instructions executable by the processor to highlight the first subset of the plurality of elements and to highlight the second subset of the plurality of elements at least in part by underlining one or more text elements.

30. The article of claim 28, wherein the storage medium has stored thereon further instructions executable by the processor of the computing platform to determine one or more elements of the second subset of the plurality of elements based, at least in part, on a plurality of relatedness factors associated with the selected one or more of the highlighted elements of the first subset of the plurality of elements and the second subset of the plurality of elements.

31. The article of claim 28, wherein the storage medium has stored thereon further instructions executable by the processor of the computing platform to highlight one or more additional elements in the electronic document based, at least in part, on the selection of the one or more of the highlighted elements of the first subset of the plurality of elements.

32. The article of claim 28, wherein the storage medium has stored thereon further instructions executable by the processor to receive the selection by the user at least in part by detecting a pointing device click performed by the user.

33. The article of claim 28, wherein the first subset of the plurality of elements comprises a relatively small number of highlighted elements and a larger number of non-highlighted elements, and wherein the storage medium has stored thereon further instructions executable by the processor to highlight one or more of the non-highlighted elements at least in part in response to the user pointing to the one or more of the non-highlighted elements.

34. The article of claim 33, wherein the storage medium has stored thereon further instructions executable by the processor to highlight one or more of the non-highlighted elements at least in part in response to the user pointing to the one or more non-highlighted elements at least in part by mousing over the one or more of the non-highlighted elements.

35. The article of claim 25, wherein the storage medium has stored thereon further instructions executable by the processor of the computing platform to add one or more elements to the electronic document based, at least in part, on the selection by the user.

36. The article of claim 35, wherein the storage medium has stored thereon further instructions executable by the processor to add the one or more elements to the electronic document at least in part by adding at least one of an overlay, a shortcut, a sidebar, and/or a portion of text.

* * * * *